Jan. 20, 1948.  H. C. PAULSEN  2,434,885
MACHINE FOR HANDLING AND FEEDING WASHERS
Filed April 4, 1944   2 Sheets-Sheet 1
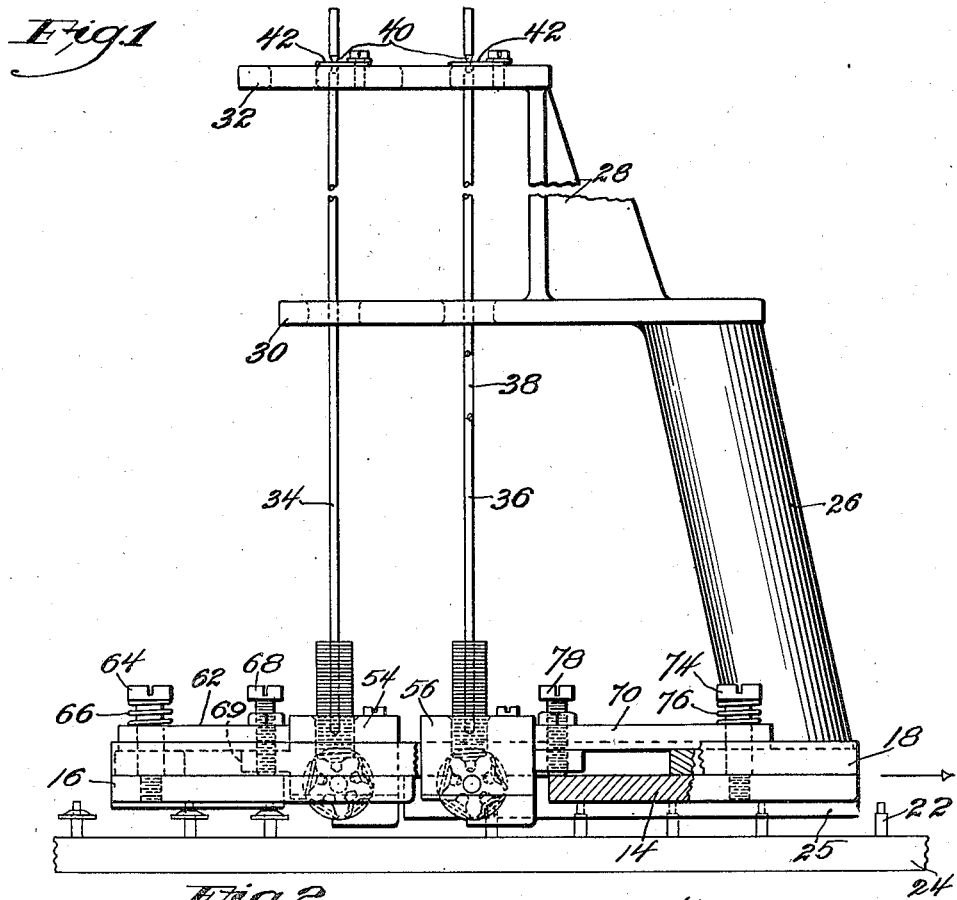
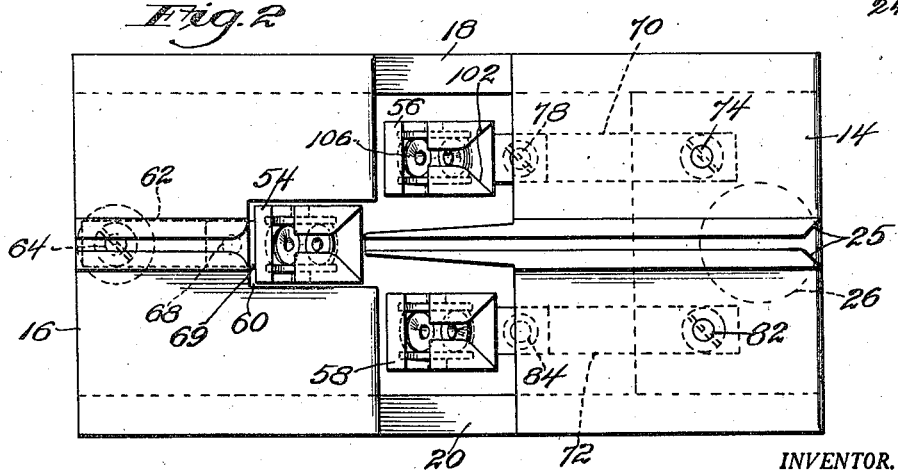
INVENTOR.
Hans C. Paulsen
BY Maxwell Fish
ATTORNEY Jan. 20, 1948. H. C. PAULSEN 2,434,885
MACHINE FOR HANDLING AND FEEDING WASHERS
Filed April 4, 1944 2 Sheets-Sheet 2
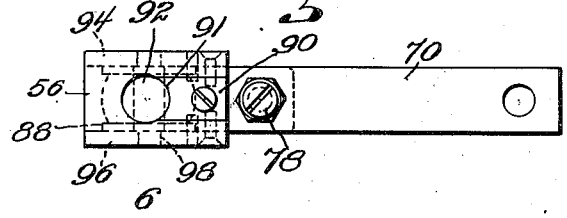
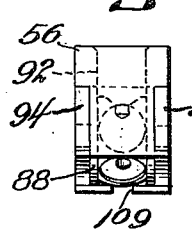
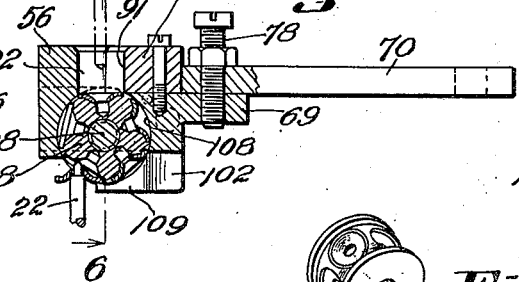
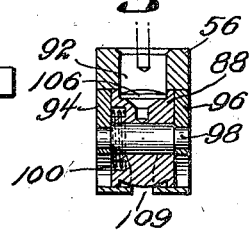
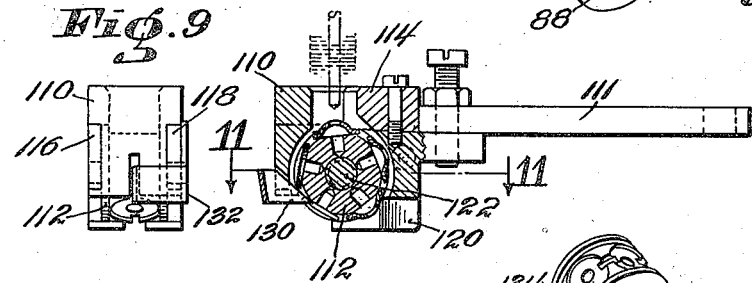
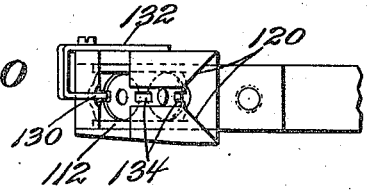
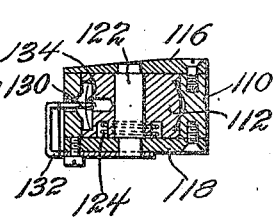
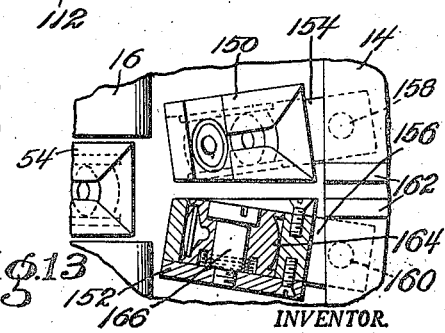
INVENTOR.
Hans C. Paulsen
BY Maxwell Fish
ATTORNEY Patented Jan. 20, 1948

2,434,885

UNITED STATES PATENT OFFICE 2,434,885

MACHINE FOR HANDLING AND FEEDING WASHERS

Hans C. Paulsen, Medford, Mass., assignor to J. W. Moore Machinery Corporation, Everett, Mass., a corporation of Massachusetts Application April 4, 1944, Serial No. 529,474

16 Claims. (Cl. 18—1)

The present invention relates to apparatus or machines for handling and feeding washers, and more particularly to such machines adapted to feed washers to rubber heel gang molds.

The machine which forms the subject-matter of the present invention is in many respects similar to that illustrated and described in the patent to Carter No. 1,740,968, comprising generally a base and frame which is arranged to ride over the pins of the mold, and provides support for three stacks of washers and for three trigger mechanisms which are movably mounted to adjust themselves laterally in accordance with the position of the pins in the mold. The trigger mechanisms act during movement of the machine over the mold to select from the stacks and to place individual washers on the pins as they pass in succession under the trigger mechanism.

It is the object of the invention to provide a novel and improved trigger mechanism for use in a machine of this general description, which is of simple and at the same time more rugged construction to withstand the wear and tear of continued use, is more certain in its operation to select and to place individual washers on the pins, and is more versatile than such machines of the prior art in the ability to feed washers accurately and certainly to the pins of all types of molds, particularly those in which the pins are placed exceptionally close to one another.

With this and other objects in view as may hereinafter appear, a feature of the invention consists in the provision in a machine for delivering washers to pins in a mold having a base adapted for movement over the pins in the mold and a supply of washers carried by the base, of a novel and improved trigger mechanism for selecting from the supply and for delivering washers to the pins which comprises a rotatable selecting and feeding element arranged to be indexed by the movement of the pins of the mold relatively thereto to select from the supply and to position washers successively in the path of the pins for loading.

In the illustrated form of the invention, the trigger mechanism takes the form of a rotatable drum having washer supporting recesses formed at equal spaced intervals from one another around its periphery and arranged for rotational movement on a transverse axis within a supporting block. The surface of the bore in the block within which the drum is received provides a guideway which cooperates with the recesses in the drum to separate individual washers from the supply, and to feed the washers successively to a pin loading position offset at a substantial angle from the horizontal at one side of a vertical plane passing through the axis of the drum. A portion of the guideway is cut away to permit the discharge of the washers from the recesses and guideway when properly seated on the respective pins.

Further in accordance with the invention, the washer supporting recesses within the drum are spaced with relation to each other and with relation to receiving, pin loading and discharge stations of the trigger device, so that each succeeding indexing movement of the drum caused by movement of the successive pins with relation thereto, is effective to substitute one recess for another at each of these stations. Movement of the distributing machine across the mold will cause a pin to engage with a washer in the pin engaging position, and will rotate the drum, causing the washer to be seated on the pin, and moving the washer with its recess to the discharge station. The recess located beneath the washers is moved away, carrying with it a single washer from beneath the stack, and another recess takes its place. At the same time, a recess and its washer are moved into the pin engaging position.

Another feature of the invention consists in the specific construction and arrangement of the rotatable washer supporting drum and guideway in which the peripheral surface of the drum is formed with a spherical curvature to cause the edge of a washer supported within a recess to be substantially flush with the surface of the drum at all points about the periphery of the washer, and in which the guideway is provided at the point of entry from the washer supply well with a separating edge correspondingly curved to provide a substantially semi-circular engagement with the next to the bottom washer of the stack for separating and retaining the same in the stacked position as the bottom washer supported in the recess is withdrawn by the indexing movement of the drum.

Another feature of the invention consists in the particular adaptability of the improved trigger mechanism to feed deep washers which are particularly intended for blind nailing and are presented to the feeding and selecting device in an inverted position.

Another feature of the invention consists in the provision of an additional disengaging device which may be used, if so desired, to positively strip the washers in succession from the drum as the drum is rotated first to place the respective washers on the pins, and thereafter to remove the washer supporting recesses of the drum away from the seated washers.

The several features of the invention consist also in the devices, combinations and arrangement of parts hereinafter described and claimed, which together with the advantages to be obtained thereby, will be readily understood by one skilled in the art from the following description taken in connection with the accompanying drawings, in which Fig. 1 is a view in side elevation of a washer distributing machine in operation to distribute the washers to the pins of a rubber heel gang mold; Fig. 2 is a bottom plan view of the washer distributing machine shown in Fig. 1; Fig. 3 is a detail plan view of one of the trigger mechanisms forming part of the machine; Fig. 4 is a view in front elevation of the trigger mechanism shown in Fig. 3, but with the supporting block and selecting and feeding drum shown in section, with the parts in position at the end of one cycle of movement of the drum in which a washer has been placed on a pin of the mold; Fig. 5 is a view of the trigger mechanism of Figs. 3 and 4 looking from the left, but with the discharged washer and supporting pin shown in Fig. 4 removed; Fig. 6 is a sectional view taken on the line 6—6 of Fig. 4; Fig. 7 is a perspective view of the washer selecting and feeding drum of the trigger mechanism; Fig. 8 is a view in side elevation, partly in section, of a modified form of trigger mechanism adapted for feeding inverted deep washers for blind nailing; Fig. 9 is a view of the trigger mechanism shown in Fig. 8, looking from the left; Fig. 10 is a bottom plan view of the trigger mechanism shown in Fig. 8; Fig. 11 is a sectional plan view taken on the line 11—11 of Fig. 8; Fig. 12 is a perspective view of the washer selecting and feeding drum shown in Fig. 8; and Fig. 13 is a detail bottom plan view showing a modified form of the machine which is particularly adapted for distributing washers to molds in which the pins are set closely together, one of the trigger mechanisms being shown in section.

Referring specifically to the drawings, the washer distributing machine herein disclosed as embodying in a preferred form the several features of the invention, comprises a base consisting of two base plates 14 and 16 mounted in a fixed spaced relation to one another by side plates 18, 20, and adapted to ride on the pins 22 of a rubber heel gang mold indicated at 24 in Fig. 1. Two parallel ribs formed on the under side of the plate 14 along the central axis of the machine provides a guideway 25 which engages with the row of centrally placed pins of each group in the heel mold. Supported on the base plate 14 is a frame comprising a handle portion 26, a further vertical standard 28 and two horizontal arms 30 and 32 which serve to support the three washer stacks of the machine. In accordance with the usual practice, the washers are stacked in a vertical position on rods indicated at 34, 36 and 38 in Fig. 1, which are provided adjacent their upper ends with reduced portions 40 for engagement with the spring holding clips 42 carried on the upper supporting arm 32, and are arranged at their lower ends to extend within receiving wells formed in the blocks of the trigger mechanisms hereinafter described. The support 30 is slotted to receive the stack pins 34, 36 and 38 and washers. The support 32 is provided similarly with apertures to receive the stack pins and washers, each aperture, however, being provided at one end with a small neck into which the upper end of the respective stack pin is moved to cause the reduced portion 40 thereof to be engaged by the corresponding spring clip 42.

For distributing washers to the pins of the molds, there are provided in the machine, three trigger mechanisms 54, 56, 58, for selecting from the stacks of washers and for feeding washers to the individual pins. The trigger mechanism 54 is mounted in a recess 60 in the plate 16 in line with the guideway 25 for distributing pins to the central row of pins of each group in the mold. The two flanking trigger mechanisms 56, 58 are supported between the base plate 14 and plate 16 in such a manner as to be readily adjustable laterally for placing washers on the flanking pins of each group in the mold. As best shown in Figs. 1 and 2, the trigger mechanism comprising the block 54 is supported on a horizontally extending arm 62 which is pivotally supported at its other end on a screw pivot 64, being held yieldingly in a low position by means of a compression spring 66 coiled about the pivot pin 64. A stop screw 68 extending downwardly through the arm 62 and the attaching lug 69 of the block 54 engages against the plate 16, and provides means for adjusting the normal rest position of the trigger mechanism with relation to the machine base and pins of the mold. The trigger mechanisms 56 and 58 are similarly mounted on supporting arms 70 and 72 respectively. The arm 70 is supported to turn on pivot pin 74, and is held by means of a spring 76 in a normal rest position determined by the engagement of stop screw 78 with the base plate 14. The supporting arm 72 for the trigger mechanism 58 is pivotally supported on a screw pivot 82 in a normal rest position determined by the adjustment of a stop screw 84 which engages against the base plate 14.

The trigger mechanism 56 is illustrated and will be particularly described in connection with Figs. 3 to 7 inclusive of the drawings. Since the three trigger mechanisms 54, 56 and 58 are substantially identical in construction and mode of operation, it is believed unnecessary to illustrate or describe in detail the remaining two mechanisms. The trigger mechanism of Fig. 3, comprises the block 56 which has formed therein a transversely extending bore to receive a washer selecting and feeding drum 88. A horizontal slot formed in the upper surface of the block is arranged to receive a filler member 90 which is provided at its inner end with a semi-circular face 91 which with the milled inner end of the slot forms a vertically arranged cylindrical well 92 to receive the stack of washers. The block 56 is provided at opposite sides thereof with cover plates 94, 96 which serve to maintain the drum 88 in position, and provide support for a pivot pin 98 for the drum. A small coiled compression spring 100 mounted in an annular recess in one face of the drum 88 is aranged to bear against the plate 94 to friction the rotational movement of the drum (see Fig. 6). The under side of the block 56 is formed with two wing cam surfaces 102 which are arranged to be engaged by the approaching pin of the mold, and act during the continued progress of the washer distributing machine to swing the trigger device into line with the pin.

The washer selecting and feeding drum 88 as best shown in Fig. 7, is provided at equally spaced intervals about its periphery with five washer receiving recesses 106 which are so shaped as to permit an easy fit of the washer therein with the edge portions thereof flush with the peripheral surface of the drum. A radially extending clearance hole 107 is provided in the center of each recess to receive the pins 22 which project upwardly through the washers when brought into operative relation thereto at the loading station by continued movement of the machine over the mold. In order that the surface of the drum may be flush with the washer around the entire circumferential edge of the washer, that portion of the peripheral surface of the drum in which the recesses are located is formed with a spherical curvature. As shown in Fig. 7, only the central portion of the peripheral surface is thus contoured, leaving at each edge of the drum an upwardly extending flange to assist in supporting and guiding the washers. It will be noted that the filler member 90 with the separating edge is of the same width as the contoured peripheral surface of the drum, and engages this surface between the flanged edge portions of the drum.

The arrangement of the washer receiving recesses 106 is such that for each indexed position of the drum, one recess will be located at the upper side of the drum in line with the washer stack receiving well 92 and two other recesses 106 will be located at the lower side of the drum at offset angles from the horizontal and at opposite sides of a vertical plane passing through the axis of the drum. These two offset positions of the recesses constitute the pin loading and washer discharge positions of the washer supporting recesses during operation of the machine. For each successive indexing movement of the drum which with the arrangement shown will be one-fifth of a revolution, the recess in each of the washer receiving, pin loading and washer discharge positions above referred to, is replaced by the next succeeding recess considered counterclockwise around the periphery of the drum.

The washers are held in their recesses 106 during the rotational movement of the drum by means of a guideway formed by the wall of the transverse bore in the block 56 within which the drum is supported. The supporting wall 108 is divided along its lower portion by a vertical slot 109 which forms an extension of the wing cam guideway 102 for guiding successive pins into register with the recesses and washers supported therein at the pin loading station. The guideway is broken away at the end of the slotted portion to provide a discharge station for discharging the washers from the recesses of the drum after they have been seated on the pins of the mold.

In order that the bottom washer of the stack which is supported in a recess 106 may be with certainty separated from the remaining washers of the stack, the curved inner face of the filler member 90 is formed along its lower edge as a separating edge which is fitted closely to the spherical curvature of the drum surface, and wipes across the recess to engage and maintain all of the washers in the stack excepting the bottom washer carried in the recess in their stacked position. The spherically curved peripheral surface of the drum and the flat semi-circular shaped separating edge formed by the face 91 of the filler member 90 cooperate in such a manner as to cause the separating edge and associated surface 91 of the filler member 90 to maintain a restraining contact with the stacked washers including the next to the bottom washer around substantially one-half of their circumference.

The operation of the trigger mechanism above set forth, may be briefly described as follows: In setting up the machine for operation, the stack of washers is placed in the position shown in Fig. 1, with the stack rod 36 extending downwardly into the well 92, but not reaching the bottom thereof, so that the washers are piled up within the well, the bottom washer bearing against the peripheral surface of the drum 88. Each successive rotational indexing movement of the drum will now act to place a washer in the next succeeding recess 106 which is brought into alignment with the well 92 and stack of washers. As previously pointed out, the recesses 106 are shaped so that the washers seated therein entirely fill the recesses with the edges of the washers at all points substantially flush with the adjacent surface of the drum, so that the remaining washers in the stack, and more particularly the washer next above the selected washer is left standing slightly above the peripheral surface of the drum. Assuming that the machine has been in operation so that the several recesses 106 have washers supported therein, movement of the washer distributing machine including the trigger mechanism 56 to the right causes an approaching pin 22 to be brought into engagement with the wing cam 102 so that the block 56 is accurately registered laterally with relation to the pin, and the pin is then engaged with a washer supported in its recess at the pin loading station. In this position the washer is tilted sufficiently to insure the engagement of the washer on the pin. Continued movement of the machine causes the pin 22 to move relatively to the left to the position shown in Fig. 4, rotating the drum 88 in a clockwise direction through one index which in the illustrated form of the device is one-fifth of one revolution of the drum. This relative movement of the machine and the pin including the rotational movement of the drum induced thereby serves to seat the washer firmly on its pin 22, and thereafter to cause the supporting recess 106 to be moved again upwardly free of the washer. The indexing movement of the drum operates to move the recess 106 previously registered with the supply well 92 in a clockwise direction to select and to remove a washer from the bottom of the stack, and to move a new recess 106 into receiving position beneath the well 92, and operates at the same time to present another recess 106 and its associated washer in the pin loading position preparatory for the loading of a washer onto the next succeeding pin of the series in the mold. If there is no washer in the recess located at the loading station as may be the case, for example, when the machine is started in operation, the cooperating pin 22 will engage in the clearance hole 107, and thereby cause the drum 88 to be indexed so that pins subsequently brought into engagement with the trigger mechanism will have washers distributed to them in the manner above described.

The trigger mechanism above described, has the advantage that it is extremely simple, and at the same time certain and efficient in operation. Since the successive washers are presented in an inclined or offset position directly in the path of movement of the pins, there is no chance of failure of the mechanism to engage and to seat a washer on each successive pin. The mechanism is particularly adapted for loading washers onto pins which are placed in a very close sequence to one another. The only limitation in closeness of spacing of the individual pins for effective use of the illustrated machine is that the pins must not be spaced apart a distance less than the distance between the pin loading and discharge positions of the drum. A further advantage of the improved trigger mechanism of the present invention, consists in the protection afforded against wear which would normally be expected by reason of the repeated actuation of the trigger mechanism through engagement with the successive pins.

With the present construction, each successive pin 22 engages only with the wing cam surfaces 102, and thereafter with the washer to be loaded, and never with any other moving part of the trigger mechanism including the drum 88.

A somewhat modified form of trigger mechanism is illustrated in Figs. 8 to 12 inclusive, of the drawings. This trigger mechanism is distinguished from that previously described principally in the different form of the recess for receiving inverted, deeply concaved washers which are particularly adapted for blind nailing, and in the provision of a stripper device to insure that each successive washer when located on its pin is positively stripped out of its recess and is left on the pin. The trigger mechanism of Figs. 8 to 12 inclusive, is capable of being substituted without difficulty for the trigger mechanisms above described in the washer distributing machine of the present invention. This mechanism comprises a block 110 which is supported on a swinging arm 111 adapted to be mounted on either of the pivot pins 74, 82, or with a different supporting arm and lug, on the pivot pin 64. In this form of the device, there is a rotatable washer receiving and feeding drum 112, a filler member 114 for separating the stack of washers from the bottom washer of the machine, cover plates 116, 118, wing cam surfaces 120, a pivot pin 122 for the drum 112, and a frictioning spring 124. As best shown in Fig. 8, the separating edge of the filler member 114 is bevelled to cause this surface to engage the raised curved portion of the next to the bottom washer in the stack, the bottom washer of the stack being supported in one of the recesses in the drum designated at 128. The separating edge of the filler member 114 is semi-circular in shape as shown in the plan view of the previously described trigger mechanism shown in Fig. 3.

In the form of the device shown in Figs. 8 to 12, a stripper device is provided to insure the removal of the successive washers from their recesses and their retention on the associated pins of the mold. This stripper mechanism comprises a wedge-shaped plate or knife element 130 which is formed on a bracket 132 secured to the block 110, and is arranged for engagement in a centrally located slot 134 formed in the peripheral surface of the drum 112. The stripper knife member 130 is arranged to ride in this slot and acts during continued rotation of the drum to ride beneath the edge of any washer which may have become stuck in its recess 128 when advanced by the engagement of the pin therewith.

Fig. 13 of the drawing, illustrates in bottom plan a modified form of distributing machine including trigger mechanisms which are particularly adapted for distributing washers to a mold in which the pins are set very close together. It will be assumed that the parts are identical with those shown, for example, in Figs. 1 and 2, except for details in the construction of the trigger mechanisms and of the central guideway through which pins are directed to the rearmost trigger mechanism. In this figure are shown portions of base plates 14 and 16 separated from one another to provide free space for the wing trigger mechanisms. Trigger mechanism 54 may be used without change. In this form of the device, two wing trigger mechanisms designated at 150 and 152 are employed, mounted respectively on arms 154 and 156 which are in turn carried on pivot pins 158 and 160. A shortened guideway 162 for directing pins into operative relation to the middle trigger mechanism 54 is provided, so that the two wing trigger mechanisms 150 and 152 are permitted to swing closer to one another. In this form of the device, the inner faces of the wing trigger mechanisms will operate as a continuation or extension of the guideway 162. Each of the trigger mechanisms 150 and 152 comprises a casing which is slabbed off along its inner face to facilitate moving the trigger mechanisms into the relatively close position shown in Fig. 12. Inasmuch as the wing trigger mechanisms are symmetrical with relation to one another in construction, it is believed necessary to describe only one of these devices in detail. The trigger mechanism 152 comprises a casing which is bored to receive a drum 164. In this form of the device, the drum is mounted on a stud 166 which is screw-threaded into the outside wall of the casing 152, and is provided with a large head which is recessed into the inner face of the drum to prevent displacement of the drum axially of the stud. The trigger mechanisms 150 and 152 apart from the peculiarities of construction above referred to, are similar to those described in connection with Figs. 1 to 7 inclusive, and are believed to need no further description.

It will be understood that the present invention is not limited to the specific form of mechanism, but that various deviations may be made therefrom as desired. It is contemplated that the illustrated machine may be adapted to distribute washers of any desired shape or size, and that appropriate changes may be made in the washer supporting recesses, in the guideway, in the separating edge of the filler block and in other parts for this purpose. Further, the invention is not limited to any particular construction or number of washer supporting recesses in the rotating member, or to any particular form or location of the washer supply means.

The nature and scope of the invention having been indicated, and a construction embodying the several features of the invention having been specifically described, what is claimed is:

1. In a machine for delivering washers to pins in a mold having a base adapted for movement over the pins in the mold and supporting means for a supply of washers, the combination of a washer distributing device comprising a support and a rotatable washer selecting and feeding element mounted therein, said support having formed therein a guideway for guiding selected washers and including surfaces for guiding pins of the mold into engagement therewith, and said rotatable element having at spaced intervals in the periphery thereof washer receiving recesses with radially extending clearance holes to receive the pins of the mold during the operation of said device in distributing washers thereto.

2. A machine for delivering washers to pins in a mold, which comprises a base arranged to slide on the pins of the mold, a supporting frame on the base including a handle for manual manipulation of the machine, supporting means for stacked supplies of washers, and washer distributing devices for selecting from said stacks and delivering washers to the pins, each comprising a block having on the under side thereof a wing cam for registering the pins with relation to the block and in the upper side thereof a washer supply conduit, a washer selecting and feeding drum supported to turn on a transverse axis within the block and having formed in the peripheral surface thereof recesses shaped to receive each a single washer, and a separating surface for separating the innermost washer received in one of said recesses from the remaining washers in said supply conduit.

3. In a machine for delivering washers to pins in a mold having a base adapted for movement over the pins in the mold, and supporting means for a supply of washers, the combination of a washer distributing device for selecting from the supply and for delivering washers to the pins, which comprises a support having a transversely extending bore formed in the support and a washer receiving well communicating with the upper side of the bore, a longitudinally extending pin-engaging slot and wing cams associated therewith formed in the under side of the support providing a pin loading station of the device, and a washer discharge aperture terminating the slot and communicating with the bore providing a discharge station of the device, and a rotatable selecting and feeding drum supported within the bore having at spaced intervals about the periphery thereof washer receiving recesses of a depth to receive a single washer and spaced with relation to one another about the periphery of the drum to cause certain of said recesses for each successive indexed position of the drum to be located in operative relation to each of the washer receiving well, the pin loading station, and at the discharge station of the device.

4. In a machine for delivering washers to pins in a mold having a base adapted for movement over the pins in the mold, and supporting means for a supply of washers, the combination of a washer distributing device for selecting from the supply and for delivering washers to the pins, said device comprising a support having formed therein a transverse bore, a well having a separating edge communicating with the upper side of the bore to provide a washer receiving station, wing cams and a longitudinally extending slot in the under side of the support communicating with the bore to provide a pin loading station, and a discharge aperture terminating in the slot and communicating with the bore to provide a discharge station, and a washer selecting and feeding drum rotatably supported within the bore having formed therein recesses of a depth to receive one washer only and spaced about the periphery of the drum to cause certain of said recesses for each indexed position of the drum to be located at each of the washer receiving station, the pin loading station, and the discharge station, the periphery of the drum having a spherical curvature to cause the circumferential edge of the washer in the recess to be flush with the surface of the drum, and the well being formed with a semi-circular supporting edge adapted to engage with and retain the washers excepting the bottom washer seated in the recess within the well.

5. In a machine for delivering washers to pins in a mold having a base adapted for movement over the pins in the mold and supporting means for a supply of washers, the combination of a washer distributing device comprising a support, and a rotatable washer selecting and feeding drum mounted therein, said drum having washer receiving recesses formed at spaced intervals about the periphery of the drum and the portions of the periphery including said recesses formed with a spherical curvature.

6. In a machine for delivering washers to pins in a mold having a base adapted for movement over the pins in the mold and supporting means for a supply of washers, the combination of a washer distributing device comprising a support, and a rotatable washer selecting and feeding drum mounted therein, said drum having washer receiving recesses formed at spaced intervals about the periphery of the drum and the portions of the periphery including said recesses formed with a spherical curvature, and a separating edge on said support of substantially semi-circular shape for separating the washers of the supply from a single washer supported in any of said recesses.

7. In a machine for delivering washers to pins in a mold having a base adapted for movement over the pins in the mold and supporting means for a supply of washers, the combination of a washer distributing device comprising a support, and a rotatable washer selecting and feeding drum mounted therein, said drum having washer receiving recesses formed at spaced intervals about the periphery of the drum and the portions of the periphery including said recesses formed with a spherical curvature and at each side thereof a flanged portion.

8. In a machine for delivering washers to pins in a mold having a base adapted for movement over the pins in the mold and supporting means for a supply of washers, the combination of a washer distributing device comprising a support, and a rotatable washer selecting and feeding drum mounted therein, said drum having washer receiving recesses formed at spaced intervals about the periphery of the drum and the portions of the periphery including said washers formed with a spherical curvature and at each side thereof a flanged portion, and said support being formed with a cooperating guideway including a separating edge of substantially semi-circular shape in proximity to said spherical peripheral portion between the flanges for separating the washers of the supply from a single washer supported in any of said recesses.

9. In a machine for delivering washers to pins in a mold, the combination with the mold and pins, of a base having the bottom surface thereof adapted for movement over the pins in the mold, supporting means for a supply of washers supported by the base, a washer distributing device operatively connected with said supporting means comprising a rotatable washer selecting and feeding element mounted with relation to the base to turn on a transverse axis with the periphery of said element extending below the bottom surface of the base, said element having means for supporting washers at intervals about the periphery thereof so spaced that washers carried by said supporting means are presented successively in the path of the relatively advancing pins.

10. In a machine for delivering washers to the pins of a mold, the combination of a base having a bottom surface thereof adapted for sliding movement over the pins of the mold, supporting means for a supply of washers supported by the base, a washer distributing device positioned below said supporting means and comprising a support on the base, and a rotatable washer selecting and feeding drum mounted thereon to turn on a transverse axis and with the periphery thereof extending below the bottom surface of the base, said rotatable drum being constructed with washer receiving recesses formed at spaced intervals about the periphery thereof, whereby the washers in said recesses are presented successively in the path of the relatively advancing pins.

11. In a machine for delivering washers to pins in a mold, the combination of a base having a bottom surface thereof adapted for movement over the pins in the mold, supporting means for a supply of washers supported by the base, a washer distributing device positioned below said supporting means and comprising a support on the base, and a rotatable washer selecting and feeding element mounted on the support to turn on a transverse axis with the periphery thereof extending below the bottom surface of the base, and having means for supporting washers at spaced intervals about said periphery, said support having surfaces cooperating with the washer supporting means constructed and arranged for successive angular positions of the drum to provide a washer selecting station, a washer loading station and a washer discharge station, whereby said washers are successively selected from the supply, are loaded onto the relatively advancing pins, and are thereafter separated on the pins from the device.

12. In a machine for delivering washers to pins in a mold, the combination with the mold and pins, of a base having a bottom surface thereof adapted for sliding movement over the pins in the mold, supporting means for a supply of washers supported by the base, a washer distributing device positioned below said supporting means and comprising a support on the base, a rotatable washer selecting and feeding element mounted on the support to turn on a transverse axis with the periphery thereof extending beneath the bottom surface of the base, and having at spaced intervals on the periphery thereof washer receiving recesses, said support having formed therein a guideway cooperating with said recesses and including surfaces for guiding pins of the mold into engagement with washers in said recesses to permit the discharge of said washers onto the pins, said intervals of spacing being selected and said surfaces being so formed to cause the washer selecting and feeding element to be rotated the peripheral extent of one interval by each successive washer engaging pin.

13. In a machine for delivering washers to pins in a mold, the combination of a base having a bottom surface thereof suitable for guiding the machine with relation to the pins on the mold, supporting means for a supply of washers on the base, a washer distributing device connected with said washer supply supporting means comprising a support on the base, and a rotatable washer selecting and feeding element having washer receiving recesses spaced at intervals about the periphery thereof and mounted on the support to turn on a transverse axis so that said recesses pass below the bottom surface of the base, said support being formed with cooperating surfaces including a separating edge for separating the washers of the supply from a single washer supported in a recess and a guideway arranged to carry washers received in the recesses below the bottom surface of the base.

14. In a machine for delivering washers to pins in a mold, the combination of a base having a bottom surface thereof adapted for movement over the pins in the mold, supporting means for a supply of washers supported by the base, a washer distributing device positioned below said supporting means and comprising a support on the base, and a rotatable washer selecting and feeding element mounted on the support to turn on a transverse axis with the periphery of said element extending below the bottom surface of the base, said rotatable element having washer receiving recesses formed at spaced intervals about the periphery thereof, and said support having formed therein cooperating surfaces including a washer selecting surface arranged to select washers from said supply, a guideway for guiding selected washers below the bottom surface of the base and including surfaces for guiding pins of the mold into engagement with said selected washers, and a stripper surface for discharging pin-engaged washers from the recesses.

15. In a machine for delivering washers to pins in a mold, the combination of a base having a bottom surface thereof adapted for movement over the pins in the mold, supporting means for a supply of washers on the base, a washer distributing device operatively connected with said washer supporting means comprising a support mounted on the base for limited transverse movements with relation thereto, a rotatable washer selecting and feeding drum mounted on said support to turn on a transverse axis and with the periphery thereof extending below the bottom surface of the base, said drum having washer receiving recesses formed at spaced intervals about the periphery thereof, and said support having formed therein a guideway for guiding selected washers in said recesses beneath the bottom surface of the base and including pin-engaging guide surfaces for positioning the support and drum transversely for guiding the pins into engagement with said recess-supported washers.

16. In a machine for delivering washers to pins in a mold, the combination of a base having the bottom surface thereof adapted for movement over the pins in the mold, supporting means for a supply of washers on the base, a washer distributing device operatively connected with said washer supporting means comprising a support mounted on the base for limited transverse movements with relation thereto, a rotatable washer selecting and feeding drum mounted on said support to turn on a transverse axis and with the periphery thereof extending below the bottom surface of the base, frictional means resisting rotational movements of said drum, said drum having washer receiving recesses formed at spaced intervals about the periphery thereof, and said support having formed therein a guideway cooperating with said recesses and including surfaces for guiding pins of the mold into engagement with washers in said recesses and to permit the discharge of said washers onto the pins, said intervals of spacing being so selected and said surfaces being so formed whereby the washer selecting and feeding element is rotated the peripheral extent of one interval by the movement of the machine over each successive washer engaging pin.

HANS C. PAULSEN.

REFERENCES CITED

The following references are of record in the file of this patent:

UNITED STATES PATENTS

| Number | Name | Date |
|---|---|---|
| 1,407,757 | Kmentt | Feb. 28, 1922 |
| 1,619,075 | Kmentt | Mar. 1, 1927 |
| 699,565 | Pugh | May 6, 1902 |
| 1,861,889 | Stoll | June 7, 1932 |